(12) United States Patent
Martinot et al.

(10) Patent No.: US 8,583,297 B2
(45) Date of Patent: Nov. 12, 2013

(54) METHOD AND DEVICE FOR OPTIMIZATION OF THE MASS OF A SATELLITE

(75) Inventors: Vincent Martinot, Ville (FR); Olivier Fratacci, Grasse (FR); Hervé Sainct, Le Cannet (FR)

(73) Assignee: Thales, Neuilly sur Seine (FR)

( * ) Notice: Subject to any disclaimer, the term of this patent is extended or adjusted under 35 U.S.C. 154(b) by 360 days.

(21) Appl. No.: 13/008,774

(22) Filed: Jan. 18, 2011

(65) Prior Publication Data

US 2012/0018586 A1 Jan. 26, 2012

(30) Foreign Application Priority Data

Jan. 19, 2010 (FR) ...................................... 10 00201

(51) Int. Cl.
*B64G 1/36* (2006.01)
(52) U.S. Cl.
USPC ........................... 701/13; 701/531; 244/158.4
(58) Field of Classification Search
USPC .............. 701/3, 4, 13, 531; 244/158.4, 158.6, 244/172.2, 173.1; 320/104
See application file for complete search history.

(56) References Cited

U.S. PATENT DOCUMENTS

| 5,393,017 | A | * | 2/1995 | Smith et al. ................. 244/158.5 |
| 5,595,360 | A | * | 1/1997 | Spitzer ........................ 244/158.5 |
| 5,669,586 | A | * | 9/1997 | Tadros .......................... 244/167 |
| 6,464,174 | B1 | | 10/2002 | Turner |
| 7,113,851 | B1 | * | 9/2006 | Gelon et al. ..................... 701/13 |
| 2003/0062452 | A1 | * | 4/2003 | Oh ................................. 244/172 |
| 2009/0299553 | A1 | * | 12/2009 | Hope ............................... 701/13 |
| 2010/0108819 | A1 | * | 5/2010 | Kawaguchi et al. ....... 244/158.5 |

FOREIGN PATENT DOCUMENTS

JP 4-349097 A 12/1992

* cited by examiner

*Primary Examiner* — Darnell Jayne
*Assistant Examiner* — Sasha T Varghese
(74) *Attorney, Agent, or Firm* — Baker & Hostetler LLP

(57) ABSTRACT

A method and a device are provided for the optimization of the mass of a satellite. The method includes: a step of calculation of an elliptical second orbit obtained by rotation of a first orbit about an axis connecting the periapsis and the apoapsis, the elliptical second orbit being associated with a second maximum eclipse duration less than a first maximum eclipse duration; a step of determination of a maneuver enabling the satellite to move to the second orbit; and a step of calculation of a second battery mass making it possible to maintain the satellite in operation during the second maximum eclipse duration and of calculation of a mass of fuel necessary to effect the maneuver.

10 Claims, 4 Drawing Sheets

(Method)

Fig. 2 (Method)

Fig. 3 (Device)

METHOD AND DEVICE FOR OPTIMIZATION OF THE MASS OF A SATELLITE

CROSS-REFERENCE TO RELATED APPLICATION

This application claims priority to foreign French patent application No. FR 1000201, filed on Jan. 19, 2010, the disclosure of which is incorporated by reference in its entirety.

FIELD OF THE INVENTION

The invention concerns the field of space missions and, more particularly, the optimization of the mass of satellites intended for missions including phases of orbit around massive bodies.

BACKGROUND

Future space programs are planned to send satellites into highly elliptical orbits such as capture orbits, possibly to deploy a lander immediately after capture or after some time spent in this capture orbit. In such orbits, given certain geometrical conditions, eclipses of long duration may occur. During these eclipses, the satellite is deprived of solar energy. The power supply and thermal regulation subsystems of the satellite must then be sufficiently rated to be able to operate for the duration of these eclipses.

Insertion trajectories leading to long eclipses are not generally used because they lead to an increase in the weight of the power supply and thermal regulation subsystems. However, in the situation where landing is initiated from the capture orbit, this can prevent a landing under good conditions (for example in sunlight) at a given latitude. This problem is all the more likely to arise when landing is effected not immediately but after some time spent in the capture orbit to avoid unfavourable landing conditions (for example periods of sandstorms on Mars or conjunctions between the planet and Earth).

In a context subject to the constraint of no modification of the shape of the orbit (for example so that orbit exit manoeuvres remain compact), the solution of changing to a circular orbit at low altitude cannot be envisaged. Nevertheless, one possible solution consists in increasing the capacity and therefore the size and the weight of the batteries onboard the spacecraft. This solution is not entirely satisfactory because the batteries then represent a high mass competing with the mass of the payload and/or occupying too much space onboard the craft. Moreover, this solution may not be sufficient for particularly long eclipses.

SUMMARY OF THE INVENTION

The invention aims in particular to alleviate the problem cited above by proposing a method and a device for the optimization of the mass of a satellite intended for a mission including a phase of orbit around a massive body taking into account the problem of long eclipses.

To this end, the invention provides a method for the optimization of the mass of a satellite intended for a mission including a phase of orbit around a massive body in an elliptical first orbit the shape and the orientation of which are constrained by another phase of the mission, the first orbit including a first point also called the periapsis and a second point also called the apoapsis and being associated with a first maximum eclipse duration necessitating a first battery mass making it possible to maintain the satellite in operation during the first maximum eclipse duration, said method being characterized in that it includes:

a step of calculation of an elliptical second orbit obtained by rotation of the first orbit about an axis connecting the periapsis and the apoapsis, the elliptical second orbit being associated with a second maximum eclipse duration less than the first maximum eclipse duration, a step of determination of a manoeuvre enabling the satellite to move to the second orbit, and a step of calculation of a second battery mass making it possible to maintain the satellite in operation during the second maximum eclipse duration and of calculation of a mass of fuel necessary to effect the manoeuvre, addition of the mass of fuel to the satellite and removal of a battery mass equivalent to the difference between the first battery mass and the second battery mass, the sum of the mass of fuel and the second battery mass being less than the first battery mass.

The invention has the advantage of avoiding oversizing of the power supply and thermal regulation subsystems of the satellite for a long eclipse that occurs only during a relatively short phase of the mission, the mission lasting several months and the eclipse lasting a few hours.

This makes it possible to optimize the design of the satellite by exchanging the mass necessary for the survival of the satellite during a long eclipse for the mass of fuel necessary to effect an orbit change manoeuvre. The mass saved in this way may be used for other scientific applications, for example.

The manoeuvre is advantageously effected near the apoapsis. The speed of the satellite being limited over this portion of the orbit, the mass of fuel necessary to effect this manoeuvre is thus significantly reduced.

The invention also concerns a device for the optimization of the mass of a satellite intended for a mission including a phase of orbit around a massive body in an elliptical first orbit the shape and the orientation of which are constrained by another phase of the mission, the first orbit including a first point also called the periapsis and a second point also called the apoapsis and being associated with a first maximum eclipse duration necessitating a first battery mass making it possible to maintain the satellite in operation during said first maximum eclipse duration, said device being characterized in that it includes:

means for calculating an elliptical second orbit obtained by rotation of the first orbit about an axis connecting the periapsis and the apoapsis, the elliptical second orbit being associated with a second maximum eclipse duration less than the first maximum eclipse duration, means for determining a manoeuvre enabling the satellite to move to the second orbit, and means for calculating a second battery mass making it possible to maintain the satellite in operation during the second maximum eclipse duration and for calculating a mass of fuel necessary to effect the manoeuvre, the mass of fuel being added to the satellite and a battery mass equivalent to the difference between the first battery mass and the second battery mass being removed from the satellite, the sum of the mass of fuel and the second battery mass being less than the first battery mass.

BRIEF DESCRIPTION OF THE DRAWINGS

The invention will be better understood and other advantages will become apparent on reading the detailed description given by way of nonlimiting example and with the aid of the figures, in which.

DETAILED DESCRIPTION

Figure 1:
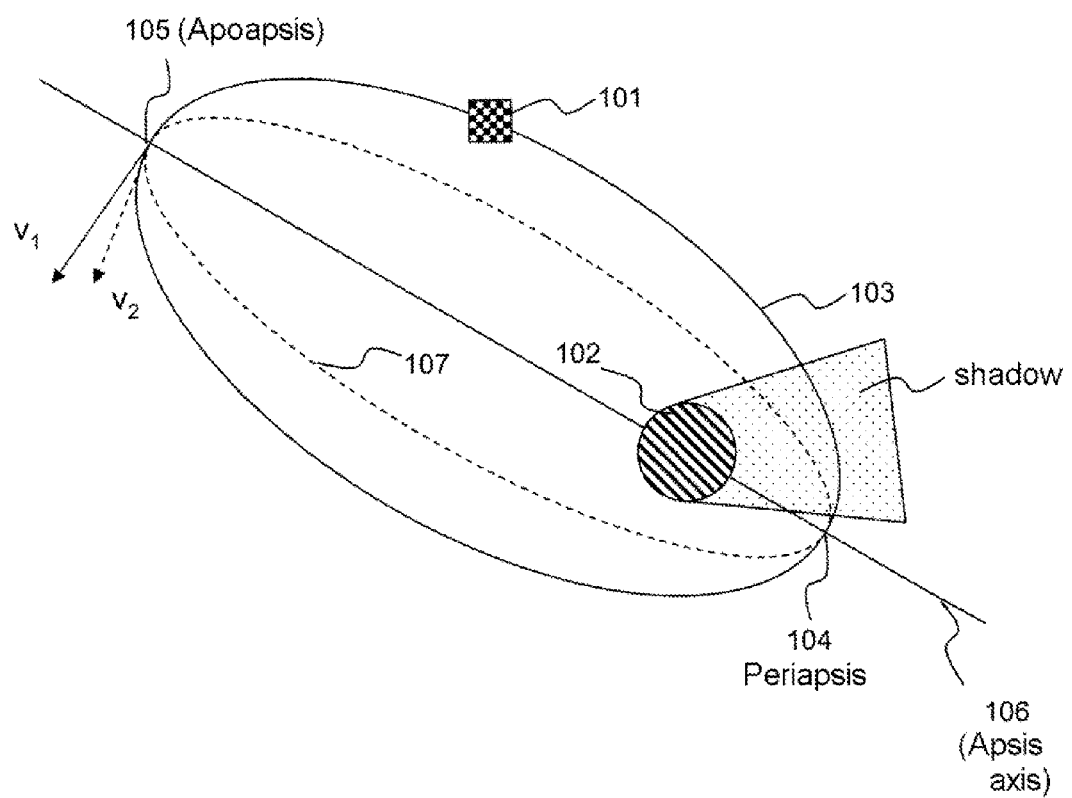
FIG. 1 represents a spacecraft in orbit around a massive body.

FIG. 1 shows a spacecraft 101 in orbit around a massive body 102. The massive body is a planet or a moon, for example. The spacecraft is a satellite or a craft intended to deploy a lander, for example. The spacecraft follows an elliptical initial orbit 103. An elliptical orbit has two remarkable points known as the apses: the first, the periapsis 104, is the point of the orbit 103 at which the distance from the massive body 102 is at a minimum; the second, the apoapsis 105, is the point of the orbit 103 at which the distance from the massive body 102 is at a maximum. The axis 106 joining the periapsis 104 and the apoapsis 105 is called the apsis axis.

The spacecraft in the initial orbit encounters a long eclipse caused by unfavourable geometrical conditions resulting from the apparent rotation of the sun around the massive body and possibly orbital disturbances (gravitational disturbances of the massive body or other bodies).

The solution of the invention consists in effecting a manoeuvre before these geometrical conditions apply. The object of this manoeuvre is to effect a rotation of the orbital plane (the plane of the ellipse) around the apsis axis 106. The speed of the craft in the initial orbit is defined by a first speed vector $v_1$. The manoeuvre does not modify the magnitude of the first vector $v_1$. On the other hand, it modifies its direction in a plane perpendicular to the apsis axis 106 to produce a second speed vector $v_2$. The elliptical first orbit 103 is associated with a first maximum eclipse duration D1.

Figure 2:
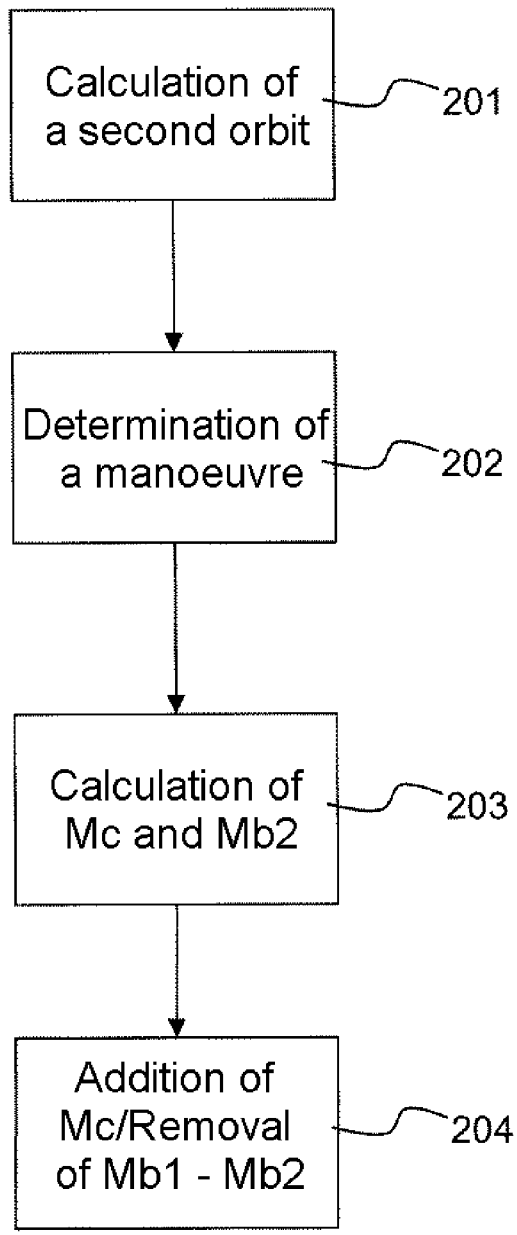
FIG. 2 is a diagram of the method of the invention.

FIG. 2 is a diagram of the method of the invention. The method includes:

a step 201 of calculation of an elliptical second orbit 107 obtained by rotation of the first orbit 103 about an axis 106 connecting the periapsis 104 and the apoapsis 105, the elliptical second orbit 107 being associated with a second maximum eclipse duration D2 less than the first maximum eclipse duration D1, a step 202 of determination of a manoeuvre enabling the satellite to move to the second orbit 107, and a step 203 of calculation of a second battery mass Mb2 making it possible to maintain the satellite in operation during the second maximum eclipse duration D2 and of calculation of a mass of fuel Mc necessary to effect the manoeuvre, a step 204 of addition of the mass Mc of fuel to the satellite and removal of a battery mass equivalent to the difference between the first battery mass Mb1 and the second battery mass Mb2, the sum of the mass Mc of fuel and the second battery mass Mb2 being less than the first battery mass Mb1.

The elliptical second orbit 107 is determined so as to conform to the following conditions: (i) the elliptical second orbit 107 has the same apoapsis 105 and the same periapsis 104 as the first orbit, (ii) the maximum eclipse duration D2 of the second orbit (i.e. the maximum duration for which a satellite in this orbit does not receive sunlight) is less than the maximum eclipse duration D1 of the first orbit. The difference D between the first maximum eclipse duration D1 and the second maximum eclipse duration D2 makes it possible to calculate a battery mass Mb. This battery mass Mb represents the quantity of battery necessary to maintain operation of the satellite during the duration difference D.

Also, it is possible to determine a mass Mc of fuel necessary to perform the manoeuvre enabling the satellite to move to the second orbit 107.

The mass Mc of fuel is less than the battery mass Mb.

This solution solves the problem of long eclipses and has the advantage of reducing the mass of the satellite.

The manoeuvre is advantageously carried out near the apoapsis 105. The apoapsis of an elliptical orbit is the point at which the satellite has the lowest speed. It is at this point that the manoeuvre consumes the least fuel. It is thus preferable to initiate the change of orbit when the satellite is close to this point, for example a few degrees ahead of or after this point.

The method advantageously further includes a step of determining a manoeuvre enabling the satellite 101 to return to the first orbit 103, the satellite carrying a supplementary fuel reserve for effecting the manoeuvre enabling the return to the first orbit 103.

According to one feature of the invention, the speed of the satellite in the initial orbit being defined by a first speed vector having a direction, the manoeuvre enabling the satellite to move to the second orbit 107 modifies the direction in a plane perpendicular to the apsis axis 106.

Figure 3:
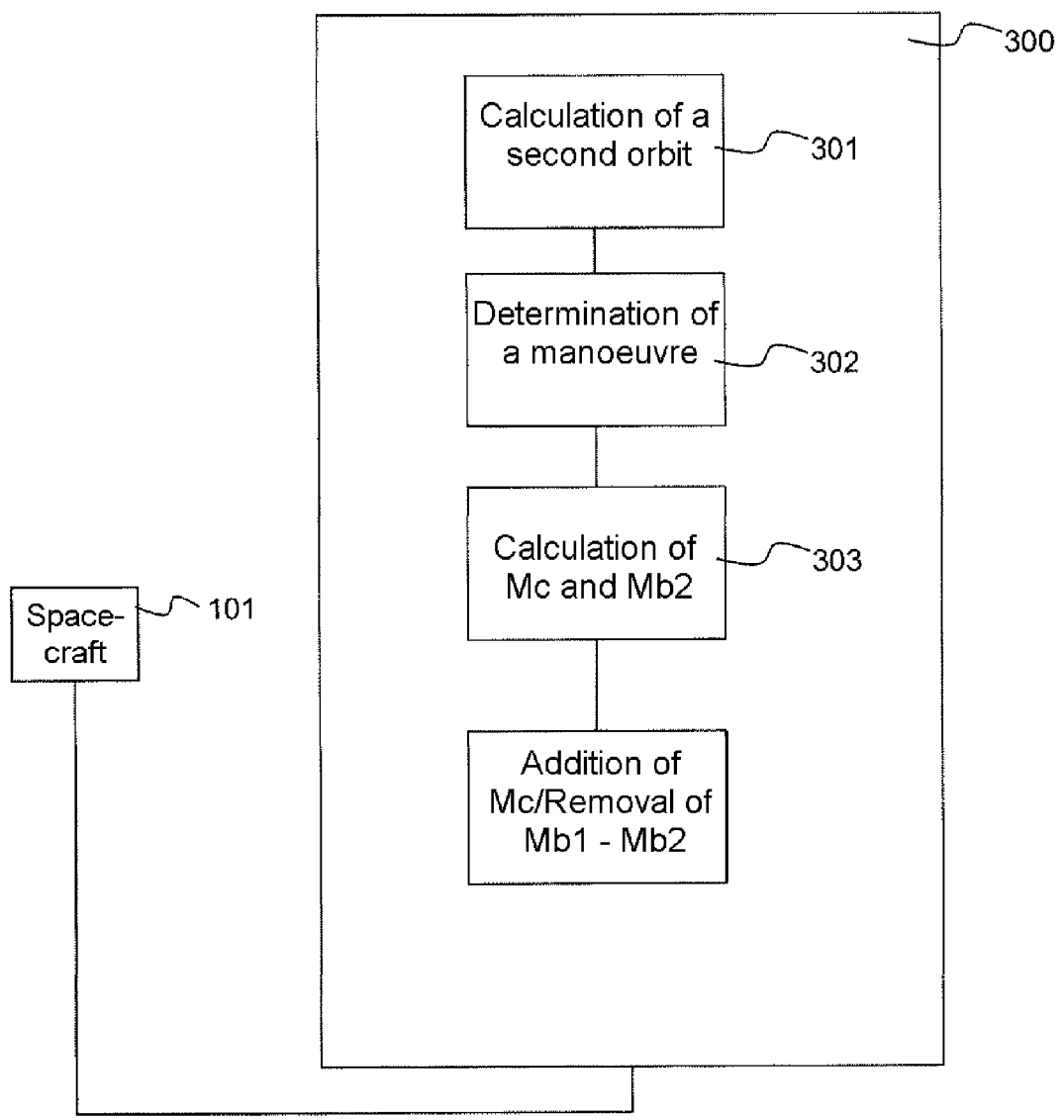
FIG. 3 represents the device of one embodiment of the invention.

FIG. 3 represents the device of one embodiment of the invention. The device 300 for the optimization of the mass of a satellite 101 intended for a mission including a phase of orbit around a massive body 102 in an elliptical first orbit 103 the shape and the orientation of which are constrained by another phase of the mission, the first orbit 103 including a first point also called the periapsis 104 and a second point also called the apoapsis 105 and being associated with a first maximum eclipse duration D1 necessitating a first battery mass Mb1 making it possible to maintain the satellite in operation during said first maximum eclipse duration D1, includes:

means 301 for calculating an elliptical second orbit 107 obtained by rotation of the first orbit 103 about an axis 106 connecting the periapsis 104 and the apoapsis 105, the elliptical second orbit 107 being associated with a second maximum eclipse duration D2 less than the first maximum eclipse duration D1, means 302 for determining a manoeuvre enabling the satellite to move to the second orbit 107, and means 303 for calculating a second battery mass Mb2 making it possible to maintain the satellite in operation during the second maximum eclipse duration D2 and for calculating a mass of fuel Mc necessary to effect the manoeuvre, the mass Mc of fuel being added to the satellite and a battery mass equivalent to the difference between the first battery mass Mb1 and the second battery mass Mb2 being removed from the battery, the sum of the mass Mc of fuel and the second battery mass Mb2 being less than the first battery mass Mb1.

Device of the invention advantageously further includes means for determining a manoeuvre enabling the satellite 101 to return to the first orbit 103, the satellite carrying a supplementary reserve of fuel for effecting the manoeuvre enabling the return to the first orbit 103.

In a variant of the invention the means 301 for calculating a second orbit 107 is situated on the ground.

In another variant of the invention the means 301 for calculating a second orbit 107 is situated onboard the satellite.

Figure 4:
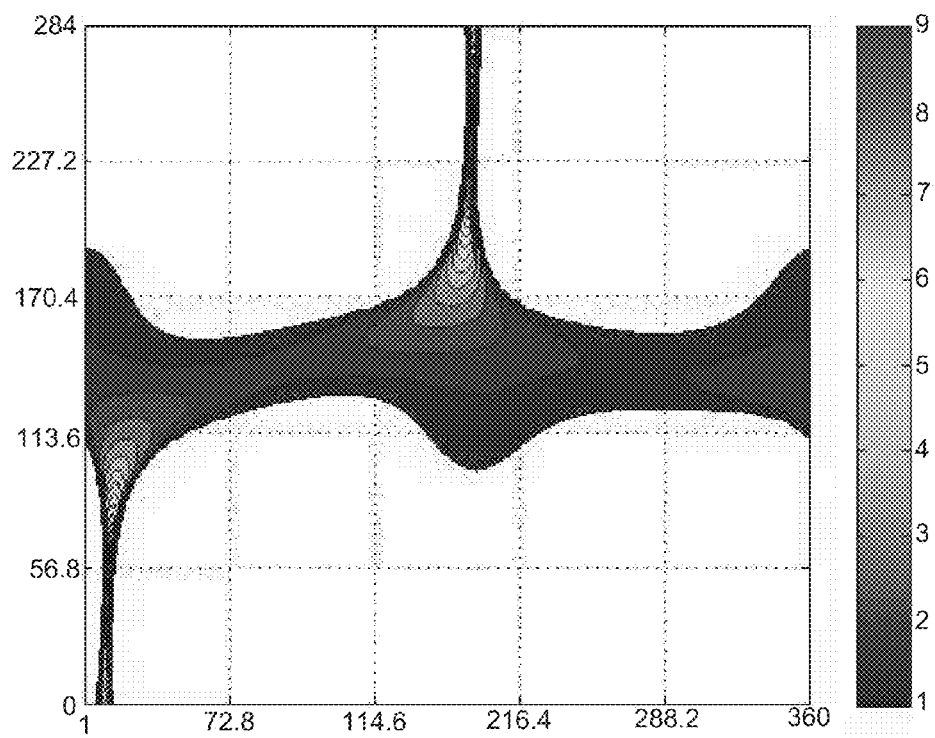
FIG. 4 represents an example of a long eclipse.

FIG. 4 represents an example of a long eclipse. The grey shades represent the duration of the eclipses in hours in an elliptical orbit around a planet as a function of the planet insertion geometry in degrees (B-plane angle, abscissa axis) and the duration in days spent in orbit (ordinate axis).

The invention claimed is:

1. A method for optimization of mass of a satellite intended for a mission including a phase of orbit around a massive body in an elliptical first orbit, a shape and orientation of which are constrained by another phase of the mission, the first orbit including a first point also called the periapsis and a second point also called the apoapsis and being associated with a first maximum eclipse duration necessitating a first battery mass making it possible to maintain the satellite in operation during said first maximum eclipse duration, said method comprising:
   a step of calculation of an elliptical second orbit obtained by rotation of the first orbit about an axis connecting the periapsis and the apoapsis, the elliptical second orbit being associated with a second maximum eclipse duration less than the first maximum eclipse duration,
   a step of determination of a manoeuvre enabling the satellite to move to the second orbit,
   a step of calculation of a second battery mass making it possible to maintain the satellite in operation during the second maximum eclipse duration and of calculation of a mass of fuel necessary to effect the manoeuvre, and
   a step of calculation of a change of mass of the satellite by addition of the mass of fuel to the satellite and removal of a battery mass equivalent to a difference between the first battery mass and the second battery mass, a sum of the mass of fuel and the second battery mass being less than the first battery mass,
   wherein said steps are carried out by a calculation and determination device.

2. The method according to claim 1 for the optimization of the mass of a satellite, wherein the manoeuvre is effected near the apoapsis.

3. The method according to claim 1 for the optimization of the mass of a satellite, further comprising a step of determination of a manoeuvre enabling the satellite to return to the first orbit, the satellite carrying a supplementary reserve of fuel for effecting the manoeuvre enabling the return to the first orbit.

4. The method according to claim 1 for the optimization of the mass of a satellite, wherein, a speed of the satellite in the first orbit is defined by a speed vector having a direction, and the manoeuvre enabling the satellite to move to the second orbit modifies the direction of the speed vector in a plane perpendicular to the axis connecting the periapsis and the apoapsis.

5. A device for optimization of a mass of a satellite intended for a mission including a phase of orbit around a massive body in an elliptical first orbit, a shape and orientation of which are constrained by another phase of the mission, the first orbit including a first point also called the periapsis and a second point also called the apoapsis and being associated with a first maximum eclipse duration necessitating a first battery mass making it possible to maintain the satellite in operation during said first maximum eclipse duration, said device comprising:
   a first component for calculating an elliptical second orbit obtained by rotation of the first orbit about an axis connecting the periapsis and the apoapsis, the elliptical second orbit being associated with a second maximum eclipse duration less than the first maximum eclipse duration,
   a second component for determining a manoeuvre enabling the satellite to move to the second orbit, and
   a third component for calculating a second battery mass making it possible to maintain the satellite in operation during the second maximum eclipse duration and for calculating a mass of fuel necessary to effect the manoeuvre, the mass of fuel being added to the satellite and a battery mass equivalent to a difference between the first battery mass and the second battery mass being removed from to the battery, a sum of the mass of fuel and the second battery mass being less than the first battery mass.

6. The device according to claim 5 for the optimization of the mass of a satellite, further comprising a fourth component for determining a manoeuvre enabling the satellite to return to the first orbit, the satellite carrying a supplementary reserve of fuel for effecting the manoeuvre enabling the return to the first orbit.

7. A method of manufacturing a satellite intended for a mission including a phase of orbit around a massive body in an elliptical orbit, a shape and orientation of which are constrained by another phase of the mission, the method comprising a phase of designing said satellite and a phase of physically manufacturing the designed satellite, wherein said phase of designing said satellite comprises optimizing the satellite mass by:
   a step of determining a first elliptical orbit of said satellite around said massive body, the first orbit including a first point, also called the periapsis, at which a distance from said massive orbit is at a minimum and a second point, also called the apoapsis, at which a distance from said massive orbit is at a maximum, and being associated with a first maximum eclipse duration;
   a step of determining a first battery mass making it possible to maintain the satellite in operation during said first maximum eclipse duration;
   a step of calculating an elliptical second orbit obtained by rotation of the first orbit about an axis connecting the periapsis and the apoapsis, the elliptical second orbit being associated with a second maximum eclipse duration less than the first maximum eclipse duration;
   a step of determining a manoeuvre enabling the satellite to move to the second orbit;
   a step of calculating a second battery mass making it possible to maintain the satellite in operation during the second maximum eclipse duration and of calculation of a mass of fuel necessary to effect the manoeuvre; and
   a step of calculating a change of mass of the satellite by addition of the mass of fuel to the satellite and removal of a battery mass equivalent to a difference between the first battery mass and the second battery mass, a sum of the mass of fuel and the second battery mass being less than the first battery mass;
   wherein said steps are carried out by a calculation and determination device.

8. The method according to claim 7 wherein said manoeuvre enabling the satellite to move to the second orbit is determined to be effected near the apoapsis.

9. The method according to claim 7 wherein said phase of designing said satellite further comprises determining a second manoeuvre enabling the satellite to return to the first orbit, and determining a supplementary reserve of fuel to be carried by the satellite for effecting said second manoeuvre.

10. The method according to claim 7 wherein a speed of the satellite in the first orbit is defined by a speed vector having a direction, and the manoeuvre enabling the satellite to move to the second orbit is determined so as to modify the direction of the speed vector in a plane perpendicular to the axis connecting the periapsis and the apoapsis.

* * * * *